US012679358B2

(12) United States Patent
Kim

(10) Patent No.: US 12,679,358 B2
(45) Date of Patent: Jul. 14, 2026

(54) METHOD AND APPARATUS FOR ADJUSTING CONTROL TORQUE OF DRIVER ASSISTANCE SYSTEM

(71) Applicant: HL Klemove Corp., Incheon (KR)

(72) Inventor: Hyeongtae Kim, Pyeongtaek-si (KR)

(73) Assignee: HL Klemove Corp., Incheon (KR)

( * ) Notice: Subject to any disclaimer, the term of this patent is extended or adjusted under 35 U.S.C. 154(b) by 87 days.

(21) Appl. No.: 18/932,182

(22) Filed: Oct. 30, 2024

(65) Prior Publication Data

US 2026/0054724 A1 Feb. 26, 2026

(30) Foreign Application Priority Data

Aug. 20, 2024 (KR) ........................ 10-2024-0111094

(51) Int. Cl.
| | |
|---|---|
| *B60W 30/12* | (2020.01) |
| *B60W 10/20* | (2006.01) |
| *B60W 30/182* | (2020.01) |
| *B60W 50/14* | (2020.01) |
| *B60W 50/00* | (2006.01) |

(52) U.S. Cl.
CPC ............ *B60W 30/12* (2013.01); *B60W 10/20* (2013.01); *B60W 30/182* (2013.01); *B60W 50/14* (2013.01); *B60W 2050/007* (2013.01);

*B60W 2510/202* (2013.01); *B60W 2520/125* (2013.01); *B60W 2540/223* (2020.02)

(58) Field of Classification Search
CPC .... B60W 30/12; B60W 10/20; B60W 30/182; B60W 40/14; B60W 30/10; B60W 2540/223; B60W 2510/202; B60W 2520/125; B60W 2050/007
See application file for complete search history.

(56) References Cited

U.S. PATENT DOCUMENTS 12,344,281 B2 * 7/2025 Kim .................. B60W 60/0057

* cited by examiner

*Primary Examiner* — Jacob M Amick
(74) *Attorney, Agent, or Firm* — Studebaker Brackett PLLC

(57) ABSTRACT

A method and an apparatus for adjusting control torque of a driver assistance system are provided, and the method for adjusting control torque of the driver assistance system according to an embodiment of the present disclosure comprises: operating the driver assistance system; when the driver assistance system is released, determining whether a second control torque lowering mode, which is a control torque lowering mode with a faster control torque lowering speed than a first control torque lowering mode, is required; adjusting the control torque lowering speed based on whether the second control torque lowering mode is required; and controlling the vehicle based on the adjusted control torque lowering speed.

20 Claims, 5 Drawing Sheets

Figure 5:
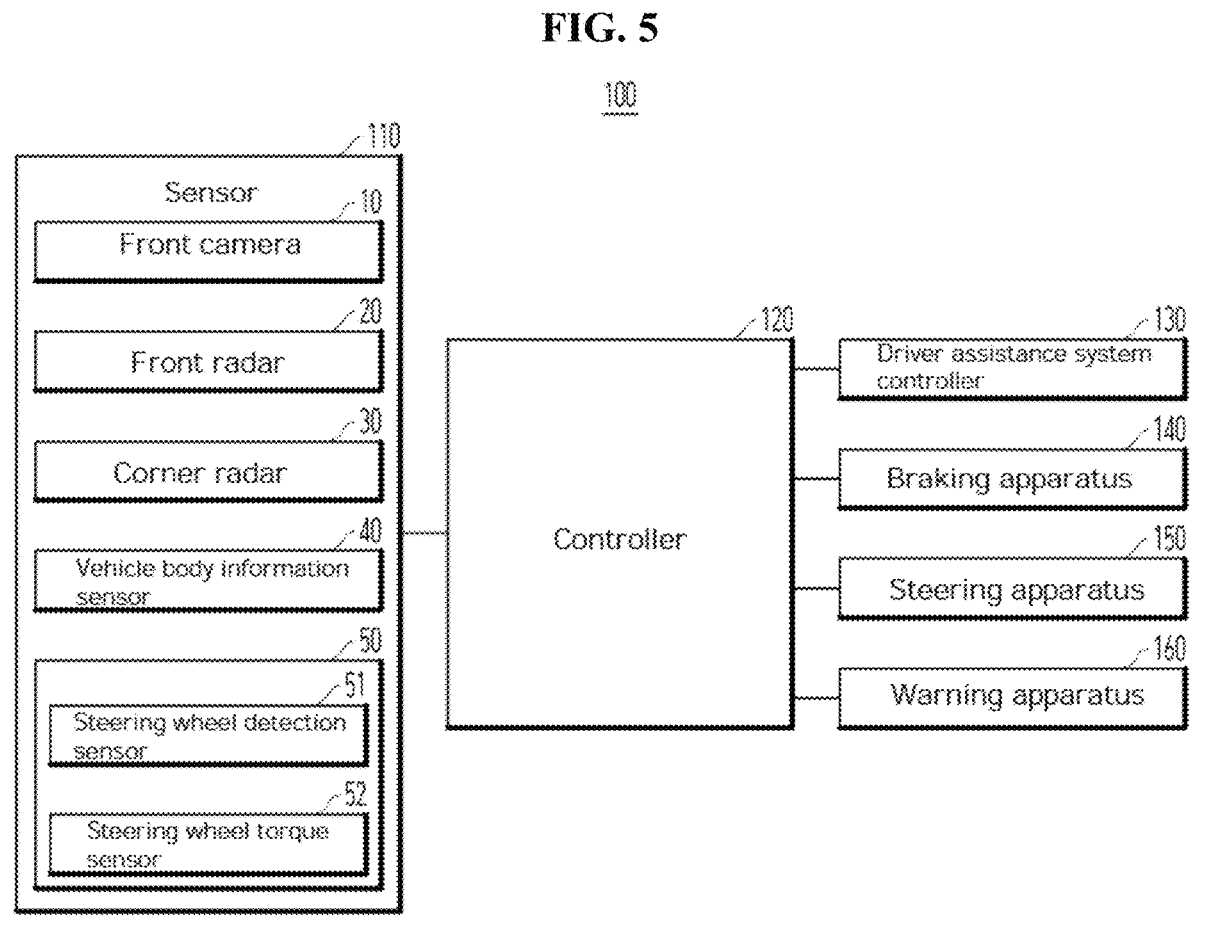

Sensor — 110

Front camera — 10

Front radar — 20

Corner radar — 30

Vehicle body information sensor — 40

50

Steering wheel detection sensor — 51

Steering wheel torque sensor — 52

Controller — 120

Driver assistance system controller — 130

Braking apparatus — 140

Steering apparatus — 150

Warning apparatus — 160

METHOD AND APPARATUS FOR ADJUSTING CONTROL TORQUE OF DRIVER ASSISTANCE SYSTEM

CROSS-REFERENCE TO RELATED APPLICATION

This application claims the benefit of and priority to Korean Patent Application No. 10-2024-0111094 filed on Aug. 20, 2024, the entire disclosures of which are incorporated herein by reference.

TECHNICAL FIELD

The present disclosure relates to a method and apparatus for adjusting control torque of a driver assistance system. More specifically, the present disclosure relates to a method and apparatus for adjusting the control torque of the driver assistance system in order to adjust the control torque lowering speed of the system depending on a situation, in a case where the driver assistance system (e.g., lane following assist (LFA) system) is released.

BACKGROUND

In a vehicle, a driver assistance system provides assistance to the driver while driving in the vehicle for the driver's convenience.

For example, Lane Following Assist (LFA) refers to a function that uses the left and right lanes to follow the center of the lane.

In such a lane following assist system, it is necessary to gradually lower the control torque of the system in order to hand over the control to the driver in a situation where the system is released. However, if the control torque of the system is always lowered for the same amount, since the driver may feel a sense of discomfort or the vehicle's behavior may change drastically, problems that cause inconvenience to the driver may occur.

Therefore, there is a need for a method and apparatus for adjusting control torque of a driver assistance system that can reduce the sense of discomfort of the driver and maintain the stable vehicle behavior, by classifying the control torque lowering speed depending on the situation in case that the Lane Following Assist (LFA) system is deactivated.

SUMMARY

The present disclosure is to solve the above-mentioned problems of the prior art, and the object of the present disclosure is to provide a method and apparatus for adjusting the control torque of a driver assistance system that can adjust the lowering speed of the control torque depending on the situation when the driver assistance system is released.

Further, the object of the present disclosure is to provide a method and apparatus for adjusting the control torque of a driver assistance system that can reduce the sense of discomfort of the driver and maintain the stable vehicle behavior, by distinguishing the case where the rapid control torque lowering (reduction) is necessary and the case where it is not depending on the situation when the driver assistance system is released, and by determining the control torque lowering speed according to predetermined conditions.

However, the technical problem to be achieved by the embodiments of the present disclosure is not limited to the technical problems described above, and other technical problems may exist.

As a technical means for achieving the above technical problem, a method for adjusting control torque of a driver assistance system according to an embodiment of the present disclosure comprises: operating the driver assistance system; when the driver assistance system is released, determining whether a second control torque lowering mode, which is a control torque lowering mode with a faster control torque lowering speed than a first control torque lowering mode, is required; adjusting the control torque lowering speed based on whether the second control torque lowering mode is required; and controlling the vehicle based on the adjusted control torque lowering speed.

Further, the driver assistance system may be a lane following assist system for assisting the vehicle to follow a center of a driving lane.

Further, if it is determined that the second control torque lowering mode is required, the adjusting of the control torque lowering speed may comprise adjusting the control torque lowering speed based on a steering torque by a driver of the vehicle.

Further, if it is determined that the second control torque lowering mode is required, the adjusting of the control torque lowering speed may comprise adjusting the control torque lowering speed so that the control torque lowering speed increases in proportion to an increase in the steering torque by the driver of the vehicle.

Further, the first control torque lowering mode may be a control torque lowering mode in case that it is determined that the second control torque lowering mode is not required when the driver assistance system is released.

Further, in the first control torque lowering mode, the adjusting of the control torque lowering speed may comprise adjusting the control torque lowering speed based on at least one of the driver's hands-on status or a lateral acceleration of the vehicle.

Further, the adjusting of the control torque lowering speed based on the driver's hands-on status may comprise reducing the control torque lowering speed when the driver's hands are off and increasing the control torque lowering speed when the driver's hands are on.

Further, the adjusting of the control torque lowering speed based on the lateral acceleration of the vehicle may comprise adjusting the control torque lowering speed so that the control torque lowering speed is inversely proportional to the lateral acceleration of the vehicle.

Further, the determining of whether the second control torque lowering mode is required may comprise: determining whether the driver assistance system is released due to a driver's steering override; determining whether the driver assistance system is released due to a failure of a steering system; and determining whether the driver assistance system is released due to an operation of a lateral control function.

Further, a maximum control torque lowering speed in the first control torque lowering mode may be less than a minimum control torque lowering speed in the second control torque lowering mode.

An apparatus for adjusting control torque of a driver assistance system according to the embodiments of the present disclosure comprises: a sensor configured to recognize surroundings of a vehicle and detecting information of the vehicle; a driver assistance system controller configured to operate or release the driver assistance system; and a controller configured to adjust a control torque lowering speed of the driver assistance system when the driver assistance system is released, wherein the controller is configured to determine whether a second control torque lowering mode, which is a control torque lowering mode with a faster control torque lowering speed than a first control torque lowering mode, is required when the driver assistance system is released, adjust the control torque lowering speed based on whether the second control torque lowering mode is required, and control the vehicle based on the adjusted control torque lowering speed.

Further, the driver assistance system may be a lane following assist system for assisting the vehicle to follow a center of a driving lane.

Further, the sensor may comprise a vehicle body information sensor, a steering wheel detection sensor, and a steering wheel torque sensor.

Further, the controller may be configured to adjust the control torque lowering speed based on a steering torque by a driver detected by the steering wheel torque sensor if it is determined that the second control torque lowering mode is required.

Further, the first control torque lowering mode may be a control torque lowering mode in case that it is determined that the second control torque lowering mode is not required when the driver assistance system is released.

Further, in the first control torque lowering mode, the controller may be configured to adjust the control torque lowering speed based on at least one of the driver's hands-on status detected by the steering wheel detection sensor or a lateral acceleration of the vehicle detected by the vehicle body information sensor.

Further, the controller may be connected with a braking apparatus configured to control a longitudinal driving of the vehicle; and a steering apparatus configured to control a lateral driving of the vehicle, and the controller may be configured to control the vehicle by controlling the steering apparatus according to the adjusted control torque lowering speed.

Further, the controller may be connected with a warning apparatus configured to issue a warning to a driver of the vehicle when entering the second control torque lowering mode according to a determination that the second control torque lowering mode is required.

Further, a maximum control torque lowering speed in the first control torque lowering mode may be less than a minimum control torque lowering speed in the second control torque lowering mode.

In a non-transitory computer-readable recording medium that records a program for executing a method for adjusting control torque of a driver assistance system on a computer according to an embodiment of the present disclosure, the method comprises: operating the driver assistance system; when the driver assistance system is released, determining whether a second control torque lowering mode, which is a control torque lowering mode with a faster control torque lowering speed than a first control torque lowering mode, is required; adjusting the control torque lowering speed based on whether the second control torque lowering mode is required; and controlling the vehicle based on the adjusted control torque lowering speed.

The above-described means for solving the problem is only exemplary and should not be construed as limiting the present disclosure. In addition to the exemplary embodiments described above, additional embodiments may exist in the drawings and the following detailed description.

According to the above-described problem-solving means of the present disclosure, it is possible to provide a method and apparatus for adjusting the control torque of the driver assistance system that can reduce the sense of discomfort of the driver and maintain the vehicle stability by determining the control torque lowering speed of the system according to predetermined conditions in a case where the rapid control torque lowering is necessary and in a case where it is not.

However, the effects obtainable from the present disclosure are not limited to the effects described above, and other effects may exist.

BRIEF DESCRIPTION OF THE DRAWINGS

FIG. 5 is a control configuration diagram schematically showing the configuration of an apparatus for adjusting the control torque of the driver assistance system according to embodiments of the present disclosure.

DETAILED DESCRIPTION

Figure 1:
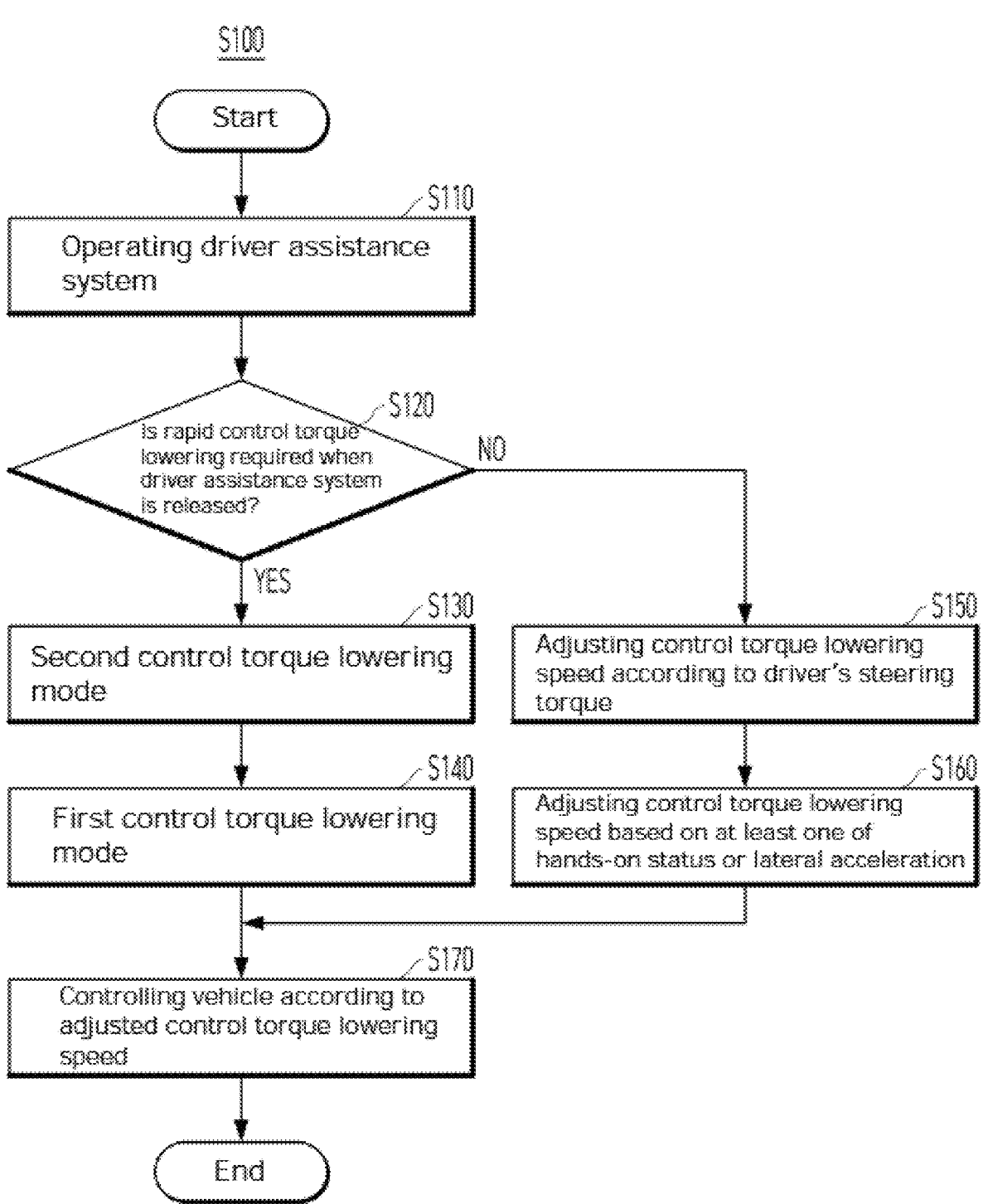
FIG. 1 is a control flowchart showing a method for adjusting a control torque of a driver assistance system according to an embodiment of the present disclosure.

Hereinafter, with reference to the accompanying drawings, embodiments of the present disclosure will be described in detail so that those skilled in the art can easily practice the embodiments. However, the present disclosure may be implemented in many different forms and is not limited to the embodiments described herein. In addition, in order to clearly describe the present disclosure in the drawings, parts irrelevant to the description are omitted, and similar reference numerals are attached to similar parts throughout the present disclosure.

Throughout the present disclosure, if a part is said to be "connected" to another part, it is not only "directly connected", but also "electrically connected" with another element in between, including cases where they are "indirectly connected".

Throughout the present disclosure, if one member is said to be located "on", "above", "under", or "below" the other member, this includes not only the case of being in contact with the other member, but also the case that another member is positioned between the two members.

Throughout the present disclosure, if a part "includes" a certain component, it does not mean excluding other components, and it does mean that it may further include other components, unless otherwise stated.

Various embodiments of the present disclosure generally relate to a method and apparatus for adjusting the control torque of a driver assistance system that adjusts the control torque lowering speed of the system depending on situations when the lane following assist system is released.

FIG. 1 is a control flowchart showing a method for adjusting a control torque of a driver assistance system according to an embodiment of the present disclosure.

Referring to FIG. 1 of the present disclosure, the method for adjusting the control torque of the driver assistance system S100 according to the embodiment of the present disclosure may comprise operating a driver assistance system S110, and determining whether the second control torque lowering mode which is a control torque lowering mode in which the control torque lowering speed of the driver assistance system is faster than a first control torque lowering mode, is required when the driver assistance system S120 is released.

Here, the driver assistance system may be, for example, a lane following (centering) assist system. Specifically, the lane following assist system may be a system that recognizes both lanes of the driving lane in which the vehicle is driving and assists the vehicle to drive with maintaining the center of the lane.

For example, in the lane following assist system, when the system is released (deactivated), in order to ensure the driver's safety and the stability of the driving behavior, the control torque (control force) applied by the system is not removed all at once, and it is necessary to gradually lower the control torque until the driver takes full control.

In the embodiment of the present disclosure, the first control torque lowering mode may mean a mode that lowers the control torque of the system when the driver assistance system is released in a normal case. Meanwhile, the second control torque lowering mode may mean a case where a faster control torque lowering speed is required than the first control torque lowering mode.

The specific method of determining whether the second control torque lowering mode is required will be discussed in more detail in the description of FIG. 2.

Subsequently, steps of adjusting the control torque lowering speed of the driver assistance system (S130 to S160), and a step of controlling the vehicle based on the adjusted control torque lowering speed (S170) may be performed, based on whether the second control torque lowering mode is required.

Meanwhile, if the faster control torque lowering speed is required than the first control torque lowering mode ('YES' in S120), it may enter the second control torque lowering mode (S130). In the second control torque lowering mode, the control torque lowering speed may be adjusted based on the driver's torque (steering torque according to the operation of the steering wheel by the driver) (S140).

On the other hand, if the rapid control torque lowering is not required ('NO' in S120), it may enter the first control torque lowering mode (S150). In the first control torque lowering mode, the control torque lowering speed may be adjusted based on at least one of whether the hands-on status or the lateral acceleration of the vehicle (S160).

A specific embodiment of adjusting the control torque lowering speed based on the driver's torque in the second control torque lowering mode, and a specific embodiment of adjusting the control torque lowering speed based on at least one of hands-on status or the lateral acceleration of the vehicle in the first control torque lowering mode will be discussed in more detail in the descriptions of FIGS. 3 and 4.

In the step of controlling the vehicle based on the adjusted control torque lowering speed S170, the vehicle may be controlled based on the control torque lowering speed adjusted according to the step S140 or the step S160. That is, the degree of control by the system may be adjusted according to the adjusted control torque lowering speed, and based on this, the driving vehicle may be controlled.

According to the method for adjusting the control torque of the driver assistance system according to the embodiment of the present disclosure, by distinguishing the case in which faster control torque lowering is required and the case in which it is not required depending on the situation when the driver assistance system is released, and by adjusting the control torque lowering speed differently for each case, it is possible to reduce the driver's sense of discomfort and maintain the vehicle behavior stability.

Figure 2:
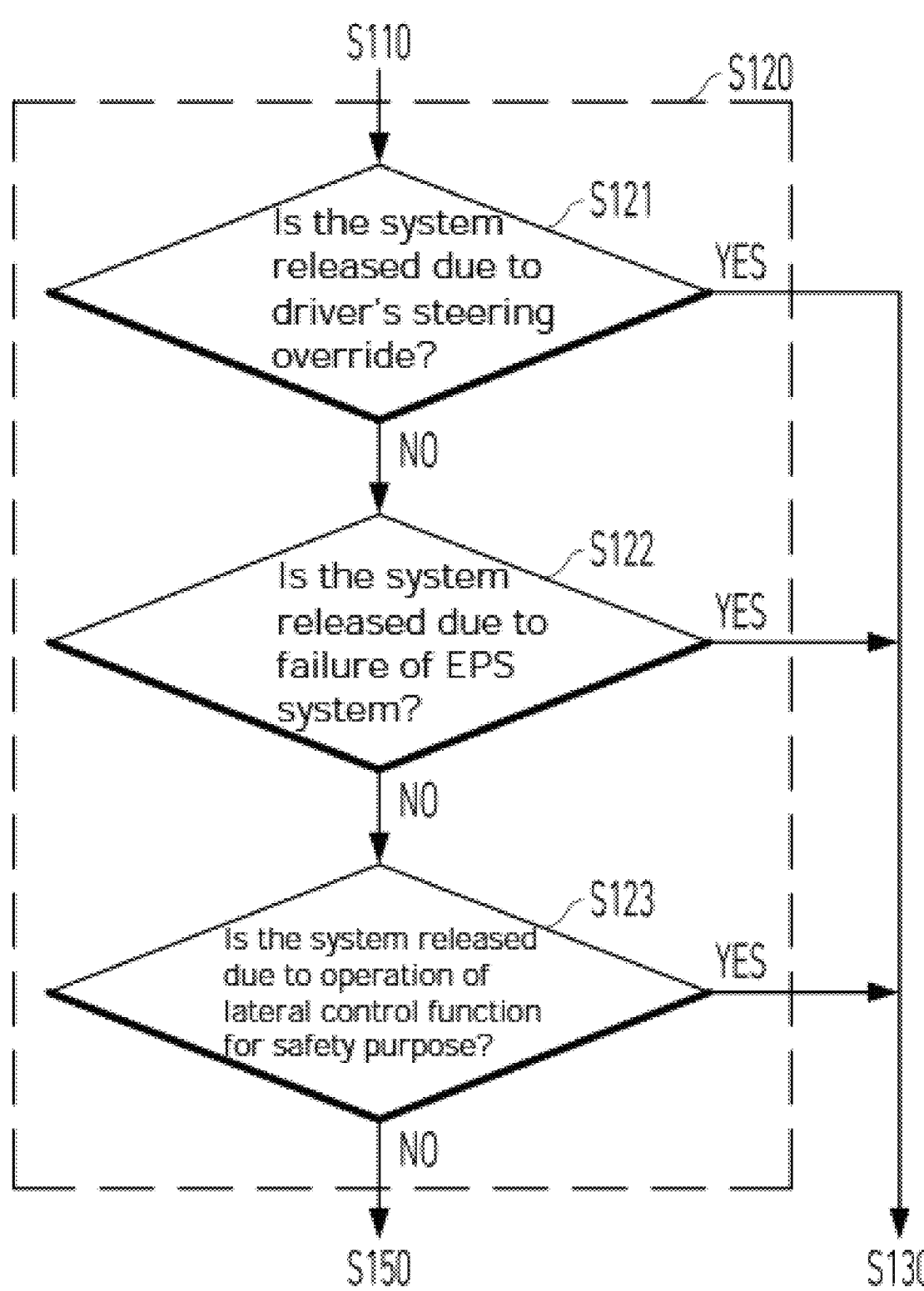
FIG. 2 is a control flowchart specifically showing the step of determining whether a rapid control torque lowering is required when releasing the driver assistance system in the method of adjusting the control torque of the driver assistance system according to the embodiment of the present disclosure.

FIG. 2 is a control flowchart specifically showing the step of determining whether a rapid control torque lowering is required when releasing the driver assistance system in the method of adjusting the control torque of the driver assistance system according to the embodiment of the present disclosure.

Referring to FIG. 2, the step of determining whether rapid control torque lowering is required when releasing the driver assistance system (whether the second control torque lowering mode is required) (S120) may comprise: determining whether the system is released due to the driver's steering override S121; determining whether the system is released due to a failure of the steering system S122; and determining whether the system is released due to an operation of the lateral control function 123.

Here, if it is satisfied any one of the cases that the system is released due to the driver's steering override, the system is released due to a failure of the steering system, or the system is released due to the lateral control function (for example, a lateral control function for a safety purpose of the driver assistance system) ('YES' in S121, 'YES' in S122, or 'YES' in S123), it may enter the second control torque lowering mode (S130).

In this regard, the lane following assist system has various system release conditions, and it is necessary to lower the control torque of the system in order to gradually transfer the control from the system to the driver when the system is released.

On the other hand, if the system is released due to the driver's steering override, if the system is released due to the failure of the steering system, or if the system is released due to the operation of the lateral control function for safety purposes, the control torque of the system needs to be rapidly reduced to minimize the driver's sense of discomfort. Therefore, it may enter the second control torque lowering mode in which the control torque lowering speed is higher than the control torque lowering speed in a normal mode of the system release (the first control torque lowering mode).

The steering system here may be an Electric Power Steering (EPS) system. Further, the case that the system is released due to the lateral control function may be, for example, the case in which the Lane Following Assist (LFA) function is released as the lateral control of the vehicle is performed due to the Emergency Lane Keeping (ELK) function for safety purposes that may be provided independently of the Lane Following Assist function.

On the other hand, if it is not the case where the system is released due to the driver's steering override, nor is it the case where the system is released due to a failure of the steering system, and nor is it the case where the system is released due to the operation of the lateral control function for safety purposes ('NO' in S121, 'NO' in S122, and 'NO' in S123), that is, if it is determined that the second control torque lowering mode is not required, it may enter the first control torque lowering mode (S150).

Figure 3:
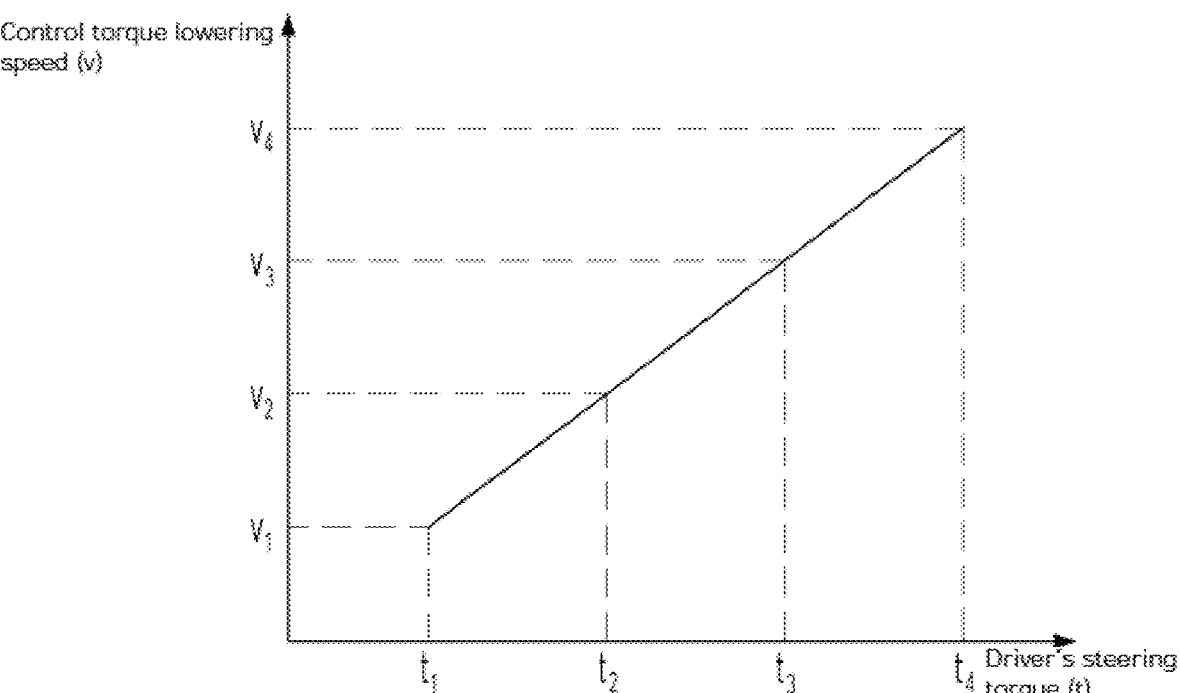
FIG. 3 is a graph illustrating a relationship between a driver's torque and a control torque lowering speed in the second control torque lowering mode in the method for adjusting the control torque of the driver assistance system according to the embodiment of the present disclosure.

FIG. 3 is a graph illustrating a relationship between a driver's torque and a control torque lowering speed in the second control torque lowering mode in the method for adjusting the control torque of the driver assistance system according to the embodiment of the present disclosure.

As illustrated in FIG. 3, in the second control torque lowering mode, adjustment of the control torque lowering speed may be performed based on the driver's torque (the steering torque by the operation of the driver).

More specifically, in the second control torque lowering mode, the control torque lowering speed may be controlled to be increased as the driver's torque increases. For example, as shown in FIG. 3, the control torque lowering speed v may be directly proportional to the driver's torque t.

In other words, the control torque lowering speed may be adjusted so that as the driver torque $t_1$, $t_2$, $t_3$, $t_4$ increases, the control torque lowering speed $v_1$, $v_2$, $v_3$, $v_4$ increases proportionally. Meanwhile, FIG. 3 illustrates that the driver's torque is directly proportional to the control torque lowering speed so that the slope is constant, but the present disclosure is not limited to this, and as long as the control torque lowering speed increases as the driver torque increases, control torque lowering speed may be adjusted differently from the embodiment of FIG. 3.

In this way, in the second control torque lowering mode, which requires a faster control torque lowering speed than the first control torque lowering mode, the control torque lowering speed of the system may be adjusted based on the driver's torque, so that the sense of discomfort felt by the driver when turning the steering wheel can be minimized.

Figure 4:
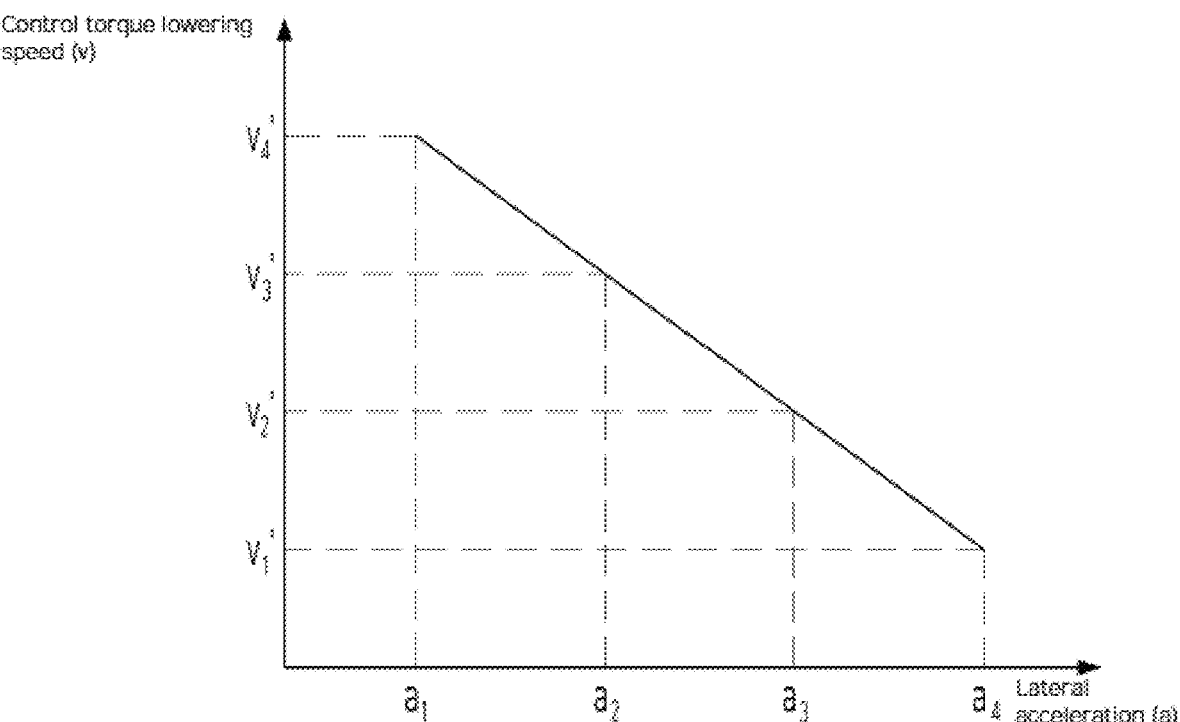
FIG. 4 is a graph illustrating a relationship between a lateral acceleration of the vehicle and the control torque lowering speed in the first control torque lowering mode in the method for adjusting the control torque of the driver assistance system according to the embodiment of the present disclosure.

FIG. 4 is a graph illustrating a relationship between a lateral acceleration of the vehicle and the control torque lowering speed in the first control torque lowering mode in the method for adjusting the control torque of the driver assistance system according to the embodiment of the present disclosure.

In the first control torque lowering mode, the control torque lowering speed may be adjusted so that the control torque lowering speed decreases as the lateral acceleration of the vehicle increases. For example, as shown in FIG. 4, the control torque lowering speed v may be adjusted to be inversely proportional to the lateral acceleration a of the vehicle.

In other words, the control torque lowering speed may be adjusted so that the control torque lowering speed $v_1'$, $v_2'$, $v_3'$, $v_4'$ decreases as the vehicle's lateral acceleration of the vehicle $a_1$, $a_2$, $a_3$, $a_4$ increases. Meanwhile, FIG. 4 illustrates that the lateral acceleration is inversely proportional to the control torque lowering speed so that the slope is constant, but the present disclosure is not limited thereto, and as long as the control torque lowering speed decreases as the lateral acceleration increases, the control torque lowering speed may be adjusted differently from the embodiment of FIG. 4.

In this way, in the first control torque lowering mode having a lower control torque lowering speed than the second control torque lowering mode, by adjusting the control torque lowering speed of the system based on the lateral acceleration of the vehicle, it is possible to reduce the sense of discomfort by speeding up the control torque lowering speed at a low lateral acceleration, and it is possible to improve the stability of the vehicle behavior by decreasing the control torque lowering speed at a high lateral acceleration.

Meanwhile, in the first control torque lowering mode, the control torque lowering speed may be adjusted depending on whether the driver's hands are on. This means that when the driver is holding the steering wheel, quickly lowering the control torque of the system helps reduce the driver's sense of discomfort, and when the driver is not holding the steering wheel, slowly lowering the control torque of the system helps to improve the stability of vehicle behavior.

For example, if the system is released while the driver is not holding the steering wheel (Hands-Off) while the vehicle is driving on a curved road, it may be appropriate to slowly lower the control torque to avoid sudden changes in the vehicle behavior. Further, if the system is released while the driver is holding the steering wheel (Hands-On) while the vehicle is driving on a curved road, it may be appropriate to quickly lower the control torque so that the driver does not feel the sense of discomfort.

Meanwhile, the control torque lowering speed adjustment according to whether the driver's hands are on or off may be applied in addition to the control torque lowering speed adjustment according to the lateral acceleration of the vehicle illustrated in FIG. 4. For example, if the driver is in a Hands-On state and the lateral acceleration of the vehicle is $a_2$, the control torque lowering speed may be set to $2v_2'$, which is the value of $v_2'$ multiplied by 2, and if the driver is in a Hands-Off state and the lateral acceleration of the vehicle is $a_3$, the control torque lowering speed may be set to $0.5v_3'$, which is the value of $v_3'$ multiplied by 0.5.

However, this is only an example, and the value to be multiplied in the Hands-On status may be set differently from the above example value if it is a value greater than 1, and in the Hands-Off state, the value to be multiplied may be set differently from the above example if it is a value less than 1.

Meanwhile, as described above, the second control torque lowering mode may be a control torque lowering mode in which the control torque lowering speed is faster than the first control torque lowering mode, and the first control torque lowering mode may be a control torque lowering mode in which it is not the case that requires the second control torque lowering mode.

Therefore, the maximum control torque lowering speed in the first control torque lowering mode calculated based on the Hands-On status and the lateral acceleration of the vehicle as explained above may be less than the minimum control torque lowering speed in the second control torque lowering mode (rapid control torque lowering speed mode).

FIG. 5 is a control configuration diagram schematically showing the configuration of an apparatus for adjusting the control torque of the driver assistance system according to embodiments of the present disclosure.

Referring to FIG. 5, the apparatus for adjusting the control torque of the driver assistance system 100 according to the embodiments of the present disclosure may comprise a sensor 110 configured to recognize the surroundings of the vehicle and detecting information of the vehicle; a driver assistance system controller 130 configured to operate or release the driver assistance system; and a controller 120 configured to adjust the control torque lowering speed of the driver assistance system when the driver assistance system is released.

In addition, when releasing the driver assistance system, the controller 120 may determine whether a second control torque lowering mode, which is a control torque lowering mode with a faster control torque lowering speed than a first control torque lowering mode, is required when the driver assistance system is released, adjust the control torque lowering speed based on whether the second control torque lowering mode is required, and control the vehicle based on the adjusted control torque lowering speed.

In addition, in the apparatus for adjusting the control torque of the driver assistance system 100 according to the embodiment of the present disclosure, the sensor 110 may comprise at least one of a front camera 10, a front radar 20, and at least one corner radar 30 installed at the vehicle. However, the present disclosure is not limited thereto, and may include other types of sensors for detecting the surroundings of the vehicle, such as an ultrasonic sensor, and a lidar sensor.

The at least one sensor installed at the vehicle may recognize the surroundings of the vehicle and enable the driver assistance function of the driver assistance system to be performed.

Additionally, the sensor 110 may include a vehicle body information sensor 40. The vehicle body information sensor 40 may detect information of the vehicle, such as a vehicle speed (lateral speed and longitudinal speed), a vehicle acceleration (longitudinal acceleration and lateral acceleration), etc.

Additionally, the sensor 110 may include a steering wheel sensor 50. The steering wheel sensor 50 may include a steering wheel detection sensor 51 configured to detect whether the driver is holding the steering wheel and a steering wheel torque sensor 52 configured to detect the steering wheel torque.

Specifically, the steering wheel detection sensor 51 can determine whether the driver is holding the steering wheel of the vehicle and determine whether the driver's hands are on or off.

In addition, the steering wheel torque sensor 52 may detect the torque of the steering wheel when the driver rotates the steering wheel, and thus may detect the driver's torque (steering torque caused by the driver's steering wheel operation).

According to the embodiment of the present disclosure, if it is determined that the second control torque lowering mode is required, the controller 120 may control to adjust the control torque lowering speed based on the driver's torque detected by the steering wheel torque sensor 52.

In addition, according to the embodiment of the present disclosure, in case of the first control torque lowering mode, the controller 120 may adjust the control torque lowering speed of the driver assistance system based on whether the driver's hands are on, which may be detected by the steering wheel detection sensor 51 and/or based on the lateral acceleration of the vehicle detected by the vehicle body information sensor 40.

Meanwhile, the driver assistance system activated (operated) or deactivated (released) by the driver assistance system controller 130 may be a lane following assist (LFA) system for assisting the vehicle to follow a center of a driving lane.

In addition, in the apparatus for adjusting the control torque of the driver assistance system 100 according to the embodiment of the present disclosure, the controller 120 may be connected with a braking apparatus 140 configured to control the longitudinal driving of the vehicle and a steering apparatus 150 configured to control the lateral driving of the vehicle.

Further, the controller 120 may control the vehicle by controlling the steering apparatus 150 according to the adjusted control torque lowering speed.

In addition, in the apparatus for adjusting the control torque of the driver assistance system 100 according to the embodiment of the present disclosure, the controller 120 may be connected with a warning apparatus 160 configured to issue an alarm to the driver of the vehicle.

Specifically, when the warning apparatus 160 enters the second control torque lowering mode according to the determination of the controller 120 that the second control torque lowering mode is required (in case that a predetermined driver assistance system release condition is satisfied), a warning may be issued to the driver of the vehicle. In this way, it is possible to notify the driver in advance that the control torque lowering speed of the system increases.

This warning apparatus 160 may include, for example, at least one of a visual warning device and an audible warning device.

Meanwhile, since the method for adjusting the control torque of the driver assistance system according to the embodiment of the present disclosure performed by the controller 120 has been described in detail previously, detailed description will be omitted here.

The disclosed embodiments may also be implemented as a computer-readable program on a computer-readable recording medium in order to be executed by a computer. A computer-readable recording medium may be a non-transitory computer-readable recording medium, such as a data storage device capable of storing data that may be read by a processor/microprocessor.

Examples of computer-readable recording media may include hard disk drives (HDD), solid-state drives (SSD), silicon disk drives (SDD), read-only memory (ROM), CD-ROM, magnetic tape, floppy disks, optical data storage devices, etc.

According to the embodiment of the present disclosure as described above, when the driver assistance system is released, the control torque (control force) lowering speed can be adjusted by distinguishing the situations, and thus, it is possible to provide a method and apparatus for adjusting the control torque of the driver assistance system that can prevent the driver from feeling the sense of discomfort caused by the control torque that remains unnecessary, and that can maintain the stability of the driving.

In addition, according to the method and apparatus for adjusting the control torque of the driver assistance system according to the embodiments of the present disclosure, the situation in which the lane following system is released may be divided into cases where rapid control torque lowering is required and cases where it is not required, and for each case by controlling the control torque lowering speed according to predetermined conditions, it is possible to achieve the reduction of the driver's sense of discomfort and ensure the vehicle behavior stability, simultaneously.

The above description of the present disclosure is for illustrative purposes, and those skilled in the art may understand that it can be easily modified into other specific forms without changing the technical spirit or essential features of the present disclosure. Therefore, the embodiments described above should be understood as illustrative in all respects and not limiting. For example, each component described as a single type may be implemented in a distributed manner, and similarly, components described as distributed may be implemented in a combined form.

The scope of the present disclosure is indicated by the following claims rather than the above detailed description, and all changes or modifications derived from the meaning and scope of the claims and equivalent concepts should be interpreted to be included in the scope of the present disclosure.

EXPLANATION OF REFERENCE

10: Front camera
20: Front radar

30: Corner radar
40: Vehicle body information sensor
50: Steering wheel sensor
51: Steering wheel detection sensor
52: Steering wheel torque sensor
100: Control torque adjusting apparatus of driver assistance system
110: Sensor
120: Controller
130: Driver assistance system controller
140: Braking apparatus
150: Steering apparatus
160: Warning apparatus

What is claimed is:

1. A method for adjusting control torque of a driver assistance system, comprising:
  operating the driver assistance system;
  when the driver assistance system is released, determining whether a second control torque lowering mode, which is a control torque lowering mode with a faster control torque lowering speed than a first control torque lowering mode, is required;
  adjusting the control torque lowering speed based on whether the second control torque lowering mode is required; and
  controlling the vehicle based on the adjusted control torque lowering speed.

2. The method of claim 1, wherein the driver assistance system is a lane following assist system for assisting the vehicle to follow a center of a driving lane.

3. The method of claim 2, wherein if it is determined that the second control torque lowering mode is required, the adjusting of the control torque lowering speed comprises adjusting the control torque lowering speed based on a steering torque by a driver of the vehicle.

4. The method of claim 3, wherein if it is determined that the second control torque lowering mode is required, the adjusting of the control torque lowering speed comprises adjusting the control torque lowering speed so that the control torque lowering speed increases in proportion to an increase in the steering torque by the driver of the vehicle.

5. The method of claim 4, wherein the first control torque lowering mode is a control torque lowering mode in case that it is determined that the second control torque lowering mode is not required when the driver assistance system is released.

6. The method of claim 5, wherein in the first control torque lowering mode, the adjusting of the control torque lowering speed comprises adjusting the control torque lowering speed based on at least one of the driver's hands-on status or a lateral acceleration of the vehicle.

7. The method of claim 6, wherein the adjusting of the control torque lowering speed based on the driver's hands-on status comprises reducing the control torque lowering speed when the driver's hands are off and increasing the control torque lowering speed when the driver's hands are on.

8. The method of claim 6, wherein the adjusting of the control torque lowering speed based on the lateral acceleration of the vehicle comprises adjusting the control torque lowering speed so that the control torque lowering speed is inversely proportional to the lateral acceleration of the vehicle.

9. The method of claim 1, wherein the determining of whether the second control torque lowering mode is required comprises: determining whether the driver assistance system is released due to a driver's steering override; determining whether the driver assistance system is released due to a failure of a steering system; and determining whether the driver assistance system is released due to an operation of a lateral control function.

10. The method of claim 1, wherein a maximum control torque lowering speed in the first control torque lowering mode is less than a minimum control torque lowering speed in the second control torque lowering mode.

11. An apparatus for adjusting control torque of a driver assistance system, comprising:
  a sensor configured to recognize surroundings of a vehicle and detecting information of the vehicle;
  a driver assistance system controller configured to operate or release the driver assistance system; and
  a controller configured to adjust a control torque lowering speed of the driver assistance system when the driver assistance system is released,
  wherein the controller is configured to determine whether a second control torque lowering mode, which is a control torque lowering mode with a faster control torque lowering speed than a first control torque lowering mode, is required when the driver assistance system is released, adjust the control torque lowering speed based on whether the second control torque lowering mode is required, and control the vehicle based on the adjusted control torque lowering speed.

12. The apparatus of claim 11, wherein the driver assistance system is a lane following assist system for assisting the vehicle to follow a center of a driving lane.

13. The apparatus of claim 12, wherein the sensor comprises a vehicle body information sensor, a steering wheel detection sensor, and a steering wheel torque sensor.

14. The apparatus of claim 13, wherein the controller is configured to adjust the control torque lowering speed based on a steering torque by a driver detected by the steering wheel torque sensor if it is determined that the second control torque lowering mode is required.

15. The apparatus of claim 13, wherein the first control torque lowering mode is a control torque lowering mode in case that it is determined that the second control torque lowering mode is not required when the driver assistance system is released.

16. The apparatus of claim 15, wherein in the first control torque lowering mode, the controller is configured to adjust the control torque lowering speed based on at least one of the driver's hands-on status detected by the steering wheel detection sensor or a lateral acceleration of the vehicle detected by the vehicle body information sensor.

17. The apparatus of claim 16, wherein the controller is connected with a braking apparatus configured to control a longitudinal driving of the vehicle; and a steering apparatus configured to control a lateral driving of the vehicle, and
  the controller is configured to control the vehicle by controlling the steering apparatus according to the adjusted control torque lowering speed.

18. The apparatus of claim 11, wherein the controller is connected with a warning apparatus configured to issue a warning to a driver of the vehicle when entering the second control torque lowering mode according to a determination that the second control torque lowering mode is required.

19. The apparatus of claim 11, wherein a maximum control torque lowering speed in the first control torque lowering mode is less than a minimum control torque lowering speed in the second control torque lowering mode.

20. A non-transitory computer-readable recording medium that records a program for executing a method for adjusting control torque of a driver assistance system on a computer, the method comprising:

operating the driver assistance system;

when the driver assistance system is released, determining whether a second control torque lowering mode, which is a control torque lowering mode with a faster control torque lowering speed than a first control torque lowering mode, is required;

adjusting the control torque lowering speed based on whether the second control torque lowering mode is required; and controlling the vehicle based on the adjusted control torque lowering speed.

* * * * *